(12) United States Patent
Kakehi et al.

(10) Patent No.: US 8,079,089 B2
(45) Date of Patent: Dec. 13, 2011

(54) INFORMATION USAGE CONTROL SYSTEM AND INFORMATION USAGE CONTROL DEVICE

(75) Inventors: Rumiko Kakehi, Tokyo (JP);
Toshikatsu Suzuki, Tokyo (JP);
Takanori Nakanowatari, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 505 days.

(21) Appl. No.: 12/128,699

(22) Filed: May 29, 2008

(65) Prior Publication Data

US 2009/0165141 A1 Jun. 25, 2009

(30) Foreign Application Priority Data

Dec. 21, 2007 (JP) .................................. 2007-329670

(51) Int. Cl.
*G06F 21/00* (2006.01)
(52) U.S. Cl. ............... 726/26; 726/4; 713/156; 713/193
(58) Field of Classification Search ...................... 726/26
See application file for complete search history.

(56) References Cited

U.S. PATENT DOCUMENTS

| | | | | |
|---|---|---|---|---|
| 6,857,071 B1* | 2/2005 | Nakae | ............................ | 713/156 |
| 7,110,543 B2* | 9/2006 | Miura et al. | ................... | 380/201 |
| 7,523,303 B2* | 4/2009 | Nakae | ............................ | 713/156 |
| 7,523,316 B2* | 4/2009 | Cheng et al. | ................... | 713/182 |
| 7,536,456 B2* | 5/2009 | Williams et al. | ............... | 709/224 |
| 7,594,258 B2* | 9/2009 | Mao et al. | ......................... | 726/9 |
| 7,743,407 B2* | 6/2010 | Sprigg et al. | ....................... | 726/4 |
| 7,827,416 B2* | 11/2010 | Hanazaki | ....................... | 713/193 |
| 2004/0255138 A1* | 12/2004 | Nakae | ............................ | 713/193 |
| 2006/0047977 A1* | 3/2006 | Hanasaki | ........................ | 713/193 |
| 2006/0206925 A1 | 9/2006 | Dillaway et al. | | |
| 2006/0248017 A1* | 11/2006 | Koka et al. | ........................ | 705/59 |
| 2007/0143855 A1* | 6/2007 | Gilchrist et al. | ................. | 726/26 |

(Continued)

FOREIGN PATENT DOCUMENTS

JP 11203125 7/1999

(Continued)

OTHER PUBLICATIONS

Notice of Grounds for Rejection and English translation thereof, mailed on Jan. 26, 2010, relating to Japanese Patent Application No. 2007-329670.

*Primary Examiner* — Kambiz Zand
*Assistant Examiner* — Yonas Bayou
(74) *Attorney, Agent, or Firm* — Gesmer Updegrove LLP

(57) ABSTRACT

A system includes: first and second devices that each register, in response to a request from a user, control information for target information in a memory, and provide, upon receipt of a request for usage information concerning the target information from the user, the user with the usage information, based on the control information in the memory, wherein the first device includes a first unit that provides, in response to the request from the user, the user with a list of the control information for the second device, and upon receipt of selection of the information from the list, sends the selected information to the second device so as to be associated with target information, and the second device includes a second unit that receives the control information associated with the target information and registers the control information in the memory so as to be associated with the target information.

5 Claims, 15 Drawing Sheets

U.S. PATENT DOCUMENTS

2009/0165141 A1 * 6/2009 Kakehi et al. .................. 726/26

FOREIGN PATENT DOCUMENTS

| | | |
|---|---|---|
| JP | 2000010777 | 1/2000 |
| JP | 2000048076 | 2/2000 |
| JP | 2001273134 | 10/2001 |
| JP | 2003058657 | 2/2003 |
| JP | 2003323224 | 11/2003 |
| JP | 2004038652 | 2/2004 |
| JP | 2004302817 | 10/2004 |
| JP | 2005332241 | 12/2005 |
| JP | 2006254464 | 9/2006 |
| JP | 2008539518 | 11/2008 |

* cited by examiner

FIG. 2

| USER ID |
|---|
| USER 11 |
| USER 12 |
| ... |

FIG. 3

| POLICY ID | PERMITTED USER | VALID PERIOD | PERMITTED OPERATION |
|---|---|---|---|
| POLICY 11 | USER 11 | UNLIMITED | REVIEW, EDIT |
|  | USER 12 | ONE MONTH FROM ISSUE DATE | PRINT |
|  | ... | ... | ... |
| POLICY 12 | GROUP 11 | 2007-09-01 – 2007-09-30 | REVIEW |
|  | ... | ... | ... |
| ... | ... | ... | ... |

FIG. 4

| CONTENT ID | POLICY ID |
|---|---|
| CONTENT 11 | POLICY 11 |
| CONTENT 12 | POLICY 12 |
| ... | ... |

FIG. 5

| USER ID |
|---|
| USER 21 |
| USER 22 |
| ... |

FIG. 6

| SERVER NAME | POLICY ID | PERMITTED USER | VALID PERIOD | PERMITTED OPERATION |
|---|---|---|---|---|
| SERVER 20 | POLICY 2A | USER 21 | UNLIMITED | REVIEW |
|  | POLICY 2B | USER 22 | 2007-09-01 – 2008-08-31 | PRINT |
|  | ... | ... | ... | ... |
| SERVER 20-1 | ... | ... | ... | ... |
| SERVER 20-2 | ... | ... | ... | ... |
| ... | ... | ... | ... | ... |

FIG. 7

| POLICY ID | PERMITTED USER | VALID PERIOD | PERMITTED OPERATION |
|---|---|---|---|
| POLICY 2A | USER 21 | UNLIMITED | REVIEW |
|  | USER 22 | 2007-09-01–2008-08-31 | PRINT |
| POLICY 2B | ... | ... | ... |
| ... |  |  |  |

FIG. 11

| POLICY ID | PERMITTED USER | VALID PERIOD | PERMITTED OPERATION |
|---|---|---|---|
| POLICY 21 | ... | ... | ... |
| POLICY 22 | ... | ... | ... |
| ... |  |  |  |
| POLICY 13 | SEE POLICY 2A | — | — |

FIG. 12

| CONTENT ID | POLICY ID |
|---|---|
| CONTENT 21 | POLICY 21 |
| CONTENT 22 | POLICY 22 |
| ... | ... |
| CONTENT 13 | POLICY 13 |

| POLICY ID | PERMITTED USER | VALID PERIOD | PERMITTED OPERATION |
|---|---|---|---|
| POLICY 11 | USER 11 | UNLIMITED | REVIEW, EDIT |
| | USER 12 | ONE MONTH FROM ISSUE DATE | PRINT |
| | ... | ... | ... |
| POLICY 12 | GROUP 11 | 2007-09-01 ~ 2007-09-30 | REVIEW |
| | ... | ... | ... |
| ... | ... | ... | ... |
| POLICY 13 | USER 11 | UNLIMITED | REVIEW, EDIT |
| | SEE POLICY 2A | — | — |

FIG. 13

| CONTENT ID | POLICY ID |
|---|---|
| CONTENT 11 | POLICY 11 |
| CONTENT 12 | POLICY 12 |
| ... | ... |
| CONTENT 13 | POLICY 13 |

FIG. 14

| POLICY ID | PERMITTED USER | VALID PERIOD | PERMITTED OPERATION |
|---|---|---|---|
| POLICY 11 | USER 11 | UNLIMITED | REVIEW, EDIT |
| | USER 12 | ONE MONTH FROM ISSUE DATE | PRINT |
| | ... | ... | ... |
| POLICY 12 | GROUP 1 | 2007-09-01 – 2007-09-30 | REVIEW |
| | ... | ... | ... |
| ... | ... | ... | ... |
| POLICY 14 | PROTECTED CONTENT PRODUCER | UNLIMITED | REVIEW, EDIT |
| | SEE POLICY 2A | – | – |
| POLICY 15 | USER 11 | ONE MONTH FROM ISSUE DATE | REVIEW |
| | SEE POLICY 2B | – | – |

FIG. 21

INFORMATION USAGE CONTROL SYSTEM AND INFORMATION USAGE CONTROL DEVICE

CROSS-REFERENCE TO RELATED APPLICATIONS

This application is based on and claims priority under 35 USC 119 from Japanese Patent Application No. 2007-329670 filed on Dec. 21, 2007.

BACKGROUND

1. Technical Field

The present invention relates to an information usage control system and an information usage control device.

2. Related Art

There is known a digital rights management (DRM: Digital Rights Management) system for controlling use of content, by means of security policy.

SUMMARY

According to an aspect of the invention, an information usage control system, including: first and second information usage control devices that each register, in response to a request from a user managed by its own information usage control device, usage control information for controlling use of control target information in a memory of its own information usage control device, so as to be associated with the control target information, and provide, upon receipt of a request for usage information concerning the control target information from the user managed by its own information usage control device, the user with the usage information for using the control target information, based on the usage control information registered in the memory of its own information usage control device so as to be associated with the control target information, wherein the first information usage control device includes a first information processing unit that provides, in response to the request from the user managed by its own information usage control device, the user with a list of the usage control information for use in the second information usage control device, and upon receipt of selection of the usage control information out of the list, sends the selected usage control information to the second information usage control device so as to be associated with control target information to which the usage control information is applied, and the second information usage control device includes a second information processing unit that receives the usage control information associated with the control target information, sent from the first information processing unit, and registers the usage control information in the memory of its own information usage control device so as to be associated with the control target information.

BRIEF DESCRIPTION OF THE DRAWINGS

Exemplary embodiments of the present invention will be described in detail by reference to the following figures, wherein:

FIG. 2 is a diagram showing one example of content stored in a user memory of a server 10;

FIG. 3 is a diagram showing one example of a policy table of the server 10;

FIG. 4 is a diagram showing one example of an association table of the server 10;

FIG. 5 is a diagram showing one example of content stored in a user memory of a server 20;

FIG. 6 is a diagram showing one example of content stored in an other-server policy memory of the server 10;

FIG. 7 is a diagram showing one example of content stored in an other-server providing policy memory of the server 20;

FIG. 11 is a diagram showing one example of a policy table of the server 20;

FIG. 12 is a diagram showing one example of an association table of the server 20;

FIG. 13 is a diagram showing one example of a policy table of the server 10;

FIG. 14 is a diagram showing one example of an association table of the server 10;

FIG. 21 is a diagram showing one example of a policy table of the server 10 according to a second exemplary embodiment;

DETAILED DESCRIPTION

In the following, exemplary embodiments of the present invention will be described by reference to the accompanying drawings.

First Exemplary Embodiment

Figure 1:
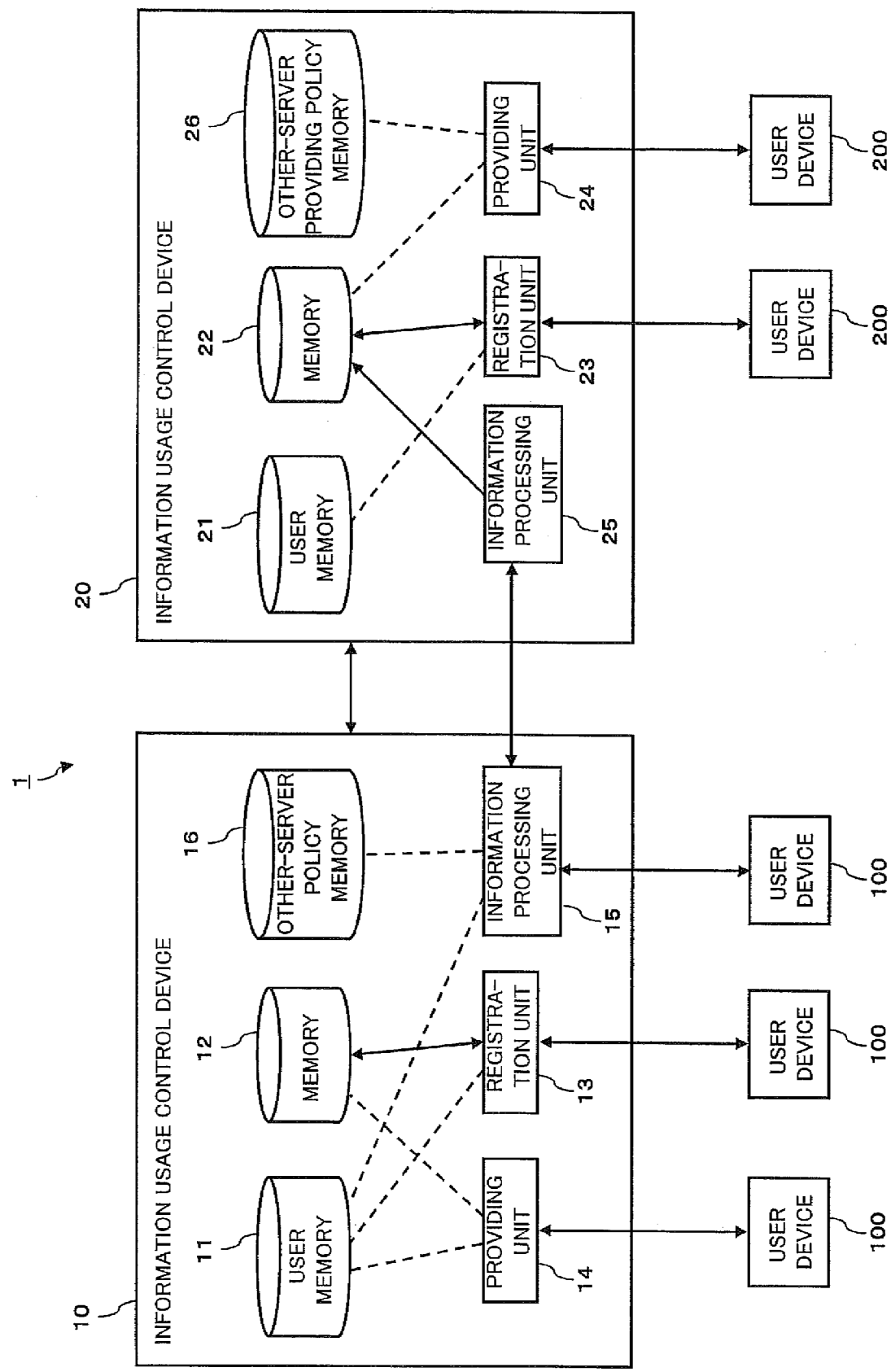
FIG. 1 is a block diagram showing one example of a structure of an information usage control system according to an exemplary embodiment.

FIG. 1 is a block diagram showing one example of a structure of an information usage control system 1 according to an exemplary embodiment. In FIG. 1, the information usage control system 1 includes two information usage control devices 10, 20, which are mutually connected for communication. The information usage control devices 10, 20, in response to respective requests from users managed by the control devices 10, 20, respectively, store usage control information for controlling use of information to be controlled (control target information), so as to be associated with the control target information, and upon receipt of a request for usage information about control target information from the respective users managed by the usage control devices 10, 20, provide the users with the usage information for using the control target information, based on the usage control information stored in association with the control target information.

According to one aspect, the information usage control devices 10, 20 are realized in cooperation between hardware resources and software; specifically, computers, for example. Specifically, the respective functions of the information usage control devices 10, 20 are realized by reading an information usage control program from a recording medium into a main memory and executing the read program by a CPU (Central Processing Unit). The information usage control program can be provided as stored in a computer readable recording medium, such as a CD-ROM or the like, or through transmission in the form of a data signal. Alternatively, the information usage control devices 10, 20 may be realized solely by means of hardware. The information usage control devices 10, 20 may be each realized by one physical device or two or more physical devices.

According to one specific aspect, the information usage control devices 10, 20 are server computers. Accordingly, an information usage control device is hereinafter referred to as a "server."

According to one aspect, the servers 10, 20 are provided in or managed by different organizations. Herein, "different organizations" refer to, e.g., different companies, different sections within one company, and so forth. According to another aspect, one server may provide service for use within a company, while the other server may provide service for use outside the company.

The server 10 includes a user memory 11, a memory 12, a registration unit 13, and a providing unit 14.

The user memory 11 stores identification information (hereinafter referred to as "user ID") identifying a user managed by the server 10. FIG. 2 shows one example of content stored in the user memory 11.

The memory 12 stores usage control information for controlling use of control target information, so as to be associated with the control target information. For example, the memory 12 stores usage control information for controlling use of control target information and identification information identifying the control target information, so as to be associated with each other.

The control target information is information to be controlled as to its use, and, specifically, content, including, for example, documents, motion pictures, static images, sounds, and so forth. Although the control target information is in the form of electronic data, according to one aspect, any information other than electronic data, such as information written on paper, is applicable. The control target information is hereinafter referred to as "content."

According to one aspect, content is protected with encryption or the like. According to this aspect, the memory 12 may store protection release information, such as information for decrypting content, for releasing content from protection, so as to be associated with the content.

The usage control information is information for controlling use of content, including, for example, information about condition or range for permitting use of content, information about restrictions on use of content, and so forth. Specifically, the usage control information contains information about a user, period, frequency, and/or operation with respect to which use of concerned content is permitted, or a combination thereof. For example, the usage control information describes which user is permitted to carry out what kind of operation during a period from when to when. The usage control information may be referred to as, e.g., security policy, and is hereinafter referred to as a "policy."

The memory 12 includes, e.g., a policy table for managing policies and an association table for managing association between content and policies.

FIG. 3 is a diagram showing one example of the policy table of the server 10. In the example shown in FIG. 3, the policy table shows, for each policy, the policy ID, or identification information identifying the policy, and content of the policy so as to be associated with each other. Each policy includes information which designates one or more users or user groups with respect to which usage of the concerned content is permitted, and usage condition information which describes usage condition, usage permission, or permitted content, all defined for and given to each user or user group, in which the usage condition information includes, for example, information indicating a period during which use is permitted, or an effective period, and information indicating an operation permitted to be carried out, and so forth FIG. 4 is a diagram showing one example of the association table of the server 10. In the example shown in FIG. 4, the association table shows, for each set of content, the content ID, or identification information identifying the content, and the policy ID of a policy for controlling use of the content, so as to be associated with each other.

In response to a request from a user managed by the server 10, the registration unit 13 registers a policy for controlling use of content in the memory 12 of the server 10 so as to be associated with the content. Specifically, the registration unit 13 receives information to be registered in the memory 12 from a user managed by the server 10, and registers the information in the memory 12. For example, the registration unit 13 receives information to be registered in the memory 12 from a device (hereinafter referred to as a "user device") 100, such as a personal computer (PC) or the like, connected to the server 10 and used by a user, and registers the information in the memory 12.

The registration unit 13 also receives, from a user, authentication information for authenticating the user, then carries out an authentication process in relation to the user, based on the received authentication information, and with the user authenticated, provides the user with the function of the registration unit 13. For example, the registration unit 13 receives the user ID from a user, and provides the user with the function of the registration unit 13 when a user ID identical to the received user ID is registered in the user memory 11, and otherwise does not provide the function.

According to one aspect, the registration unit 13 receives a policy from a user, and registers the policy in the policy table so as to be associated with the policy ID thereof. Further, the registration unit 13 receives a content ID and a policy ID from a user, and registers the same in the association table so as to be associated with each other, in which the content ID is contained in the content identified by itself. According to an aspect involving content protected with encryption or the like, for example, the registration unit 13, when defining association, provides a user with protection information (e.g., an encryption key) for protecting content, and registers protection release information (e.g., a decryption key) for releasing the content from protection in the association table so as to be associated with the content ID. The user protects (e.g. by encryption) the content, using the protection information.

Registration of a policy in the policy table and registration of association in the association table may be performed by different users or user devices or by the same user or user device.

The providing unit 14, upon receipt of a request for usage information concerning content from a user managed by the server 10, provides the user with the usage information for using the content, based on the policy registered in the memory 12 in association with the content. For example, the providing unit 14 receives a request for usage information concerning content from the user device 100 connected to the server 10, and provides the user device 100 with the usage information for using the content, with reference to the memory 12 and based on the policy for the content.

The providing unit 14 also receives, from a user, authentication information for authenticating the user, then carries out an authentication process in relation to the user, based on the received authentication information, and with the user authenticated, provides the user with the function of the providing unit 14. For example, the providing unit 14 receives the user ID from a user, and provides the user with the function of the providing unit 14 when a user ID identical to the received user ID is registered in the user memory 11, and otherwise does not provide the function.

The usage information may include, e.g., information for enabling use of content, information necessary to use content, information describing content usage conditions or usage permission, and so forth. Usage information is referred to as, e.g., a license, and is hereinafter referred to as a "license."

Specific examples of a license may include, e.g., the below (a1) to (a3). (a1) A license that contains information permitting use of content. In this case, the user device 100 permits a user to use content when a license is received, and otherwise does not permit such use. "To use the content" may include some specific operation among multiple kinds of operations in relation to the content. For example, the user device 100 may permit review of content regardless of whether or not a license is received, and permit printing of content only when the license is received. (a2) A license that contains information about usage conditions, such as a period, frequency, operation, and so forth, with respect to which use of content is permitted. In this case, the user device 100 permits a user to use content within a range in conformity with the usage conditions. For example, the user device 100 enables operation in relation to content only in the manner permitted among multiple kinds of operations. (a3) A license that contains protection release information (e.g., a decryption key) for releasing protected content from protection. In this case, the user device 100 releases content from protection, using the protection release information. For example, the encrypted content is decrypted.

According to one aspect, based on a policy for content related to a request, the providing unit 14 determines whether or not the user identified by the user ID sent from the requester is permitted to use the content, and if permitted, provides the requester with a license containing usage conditions defined for the user. In the above, the providing unit 14 may determine whether or not a part or entirety of the usage conditions defined for the user is satisfied, and if satisfied, may provide the requester with a license. For example, the providing unit 14 may determine whether or not the requested use will be made within a valid period, and if within the period, may provide the requester with a license indicating a permitted operation.

The server 20 includes a user memory 21, a memory 22, a registration unit 23, and a providing unit 24. In the following, the user memory 21, memory 22, registration unit 23, and providing unit 24 will be described briefly and not in detail, as these are identical with corresponding elements of the server 10.

The user memory 21 stores identification information (user ID) identifying a user to be managed by the server 20. FIG. 5 shows one example of content stored in the user memory 21.

The memory 22 stores a policy for controlling use of content, so as to be associated with the content.

In response to a request from a user managed by the server 20, the registration unit 23 registers a policy for controlling use of content in the memory 22 of the server 20 so as to be associated with the content. For example, the registration unit 23 receives information to be registered in the memory 22 from the user device 200 connected to the server 20, and registers the information in the memory 22.

The providing unit 24, upon receipt of a request for a license for content from a user managed by the server 20, provides the user with a license for using the content, based on the policy registered in the memory 22 in association with the content. For example, the providing unit 24 receives a request for a license for content from the user device 200 connected to the server 20, and provides the user device 200 with a license for using the content, with reference to the memory 22 and based on the policy for the content.

The respective servers 10, 20 in this embodiment are configured as described below.

The server 10 has an information processing unit 15 for sending, upon receipt of a request from a user managed by the server 10, a list of policies for use in the server 20 (hereinafter denoted "a server 20 policy") to the user, and upon receipt of selection of a policy from the list, sending the selected policy to the server 20 so as to be associated with the content to which the policy is applied.

For example, the information processing unit 15 receives a policy list request from the user device 100, provides the user device 100 with the server 20 policy list, receives selection of a policy from the list from the user device 100, and sends the selected policy to the server 20 so as to be associated with the content to which the policy is applied.

Alternatively, for example, the information processing unit 15 may receive selection of a policy from a user, and send the server 20 the selected policy and the content ID of the content to which the policy is applied, in which the information processing unit 15 may receive the content ID from the user and send the same to the server 20, or produce the content ID and send the same to the user as well as to the server 20.

Meanwhile, the server 20 has an information processing unit 25 for receiving a policy for content from the information processing unit 15 of the server 10, and registers the policy in the memory 22 of the server 20 so as to be associated with the content.

For example, the information processing unit 25 receives from the information processing unit 15 the policy selected by the user and the content ID of the content to which the policy is applied, and registers the same in the memory 22 so as to be associated with each other.

Each of the servers 10, 20 may have information processing units 15, 25. That is, the server 10 may have a function similar to that of the server 20, while the server 20 may have a function similar to that of the server 10.

Although two servers are shown in the example in FIG. 1, any number, more than one, of servers may be provided. That is, three or more servers may be provided.

When three or more servers are provided, one of the servers may, in response to a request from a user thereof, provide the user with a list of policies for the other two or more servers, then receive selection of a policy from the list, and send the selected policy to a server related to the policy so as to be associated with the content to which the policy is applied. That is, two or more servers similar to the server 20 may exist with respect to one server 10.

Also, with three or more servers provided, one of the servers may receive a policy for content from the other two or more servers, and store the same in its own memory. That is, two or more servers similar to the server 10 may exist with respect to one server 20.

According to one aspect, the server 10 includes an other-server policy memory 16 for storing a policy for other servers (an other-server policy). The information processing unit 15, in response to a request from a user, provides the user with a list of policies of another server, stored beforehand in the other-server policy memory 16. According to this aspect, the server 10 has received an other-server policy from the other server via, e.g., transmission and so forth, and registered the same in the other-server policy memory 16. The server 10 is provided with a policy from the other server with which, e.g., the server 10 has a trustful relation. The server 10 may update the content stored in the other-server policy memory 16, using an other-server policy received from another server at an appropriate timing.

FIG. 6 shows one example of content stored in the other-server policy memory 16 of the server 10. In the example shown in FIG. 6, for each of the servers 20, 20-1, 20-2, and so forth; the policy IDs; and contents of the respective policies are stored so as to be associated with each other. Notably, the servers 20-1, 20-2, and so forth are similar to the server 20.

According to another aspect, in response to a request from a user, the information processing unit 15 receives other-server policies from other servers, and provides the user with a list of the received policies.

According to one aspect, the server 20 includes an other-server providing policy memory 26 for storing the policy IDs and content of server 20 policies to be provided to other servers, such as the server 10 or the like, so as to be associated with each other. According to this aspect, the server 10 sends to the server 20 the policy ID of the policy selected by the user. For example, the server 10 sends to the server 20 the policy ID of the policy selected by the user and the content ID of the content to which the policy is applied, and the server 20 stores the received content ID and policy ID in the association table of the memory 22 so as to be associated with each other. In the server 20, content of the policy identified by the selected policy ID is obtained from the other-server providing policy memory 26.

FIG. 7 shows one example of content stored in the other-server providing policy memory 26 of the server 20. In the example shown in FIG. 7, the policy IDs and contents of policies to be provided to other servers are stored so as to be associated with each other.

According to one aspect, the information processing unit 15 is included in the registration unit 13. That is, the registration unit 13 has the function of the information processing unit 15. According to one aspect of this aspect, in response to a request from a user, the registration unit 13 provides the user with a list of policies for use in its own server 10 (e.g., a list of policies registered in the policy table in the memory 12) and a list of policies for use in other servers, then receives a policy selection from the user, and with the selected policy being the one for its own server 10, registers the policy in the memory 12 so as to be associated with the content to which the policy is applied, or with the selected policy being one for another server, sends the policy to the server having provided the policy, so as to be associated with the content to which the policy is applied. According to another aspect, the registration unit 13 receives designation of a server from a user, and provides the user with a list of policies for the designated server. Specifically, the registration unit 13 provides the user with a list of policies for the server 10 when the server 10 is designated, or a list of policies for the server 20 when the server 20 is designated.

According to one aspect, upon receipt of policy selection from a user, the information processing unit 15 sends the other server the selected policy so as to be associated with the content to which the policy is applied, and moreover registers in the memory 12 a policy for use in the server 10 with respect to the content, so as to be associated with the content, in which the policy for use in the server 10 with respect to the content may be predetermined or designated by the requester. The predetermined policies may include, e.g., a policy for permitting the requester to use the content. According to one aspect of the aspect, the information processing unit 15 produces a new policy which contains an other-server policy selected by the requester or the policy ID thereof and a server 10 policy or the policy ID thereof, and registers the same in the memory 12. The predetermined policy and/or the server 10 policy to be contained in the new policy may be set beforehand for each of the other servers.

According to one aspect, the information processing unit 25, upon receipt of a policy for content from the information processing unit 15, sends the information processing unit 15 second protection information for protecting the content. Moreover, the information processing unit 25 registers second protection release information corresponding to the second protection information in the memory 22 so as to be associated with the content. For example, the information processing unit 25 receives a policy for content, then sends second encryption information (e.g., an encryption key) for encrypting the content to the information processing unit 15, and registers second decryption information corresponding to the second encryption information in the memory 22 so as to be associated with the content.

Meanwhile, the information processing unit 15 provides the requester with the second protection information received from the information processing unit 25 and first protection information for protecting the content, and moreover registers a policy for use in the server 10 with respect to the content and first protection release information corresponding to the first protection information in the memory 12 of the server 10 so as to be associated with the content. For example, the information processing unit 15 provides the requester with the second encryption information received from the information processing unit 25 and first encryption information (e.g., an encryption key) for encrypting the content, and moreover registers a policy for use in the server 10 with respect to the content and first decryption information corresponding to the first encryption information in the memory 12 so as to be associated with the content.

The requester or the user device 100 thereof, upon receipt of the first and second protection information from the information processing unit 15, protects the content, using the first and second protection information, to thereby produce protected content. For example, the requester or the user device 100 thereof encrypts the content, using the received first and second encryption information, to thereby produce encrypted content.

When a request for a license for the content having been protected by means of the first and second protection information is received from a user managed by the server 10, the providing unit 14 provides the user with a license which contains information for releasing the content from protection, obtained from the first protection release information associated with the content, based on the policy registered in the memory 12 in association with the content. For example, the providing unit 14 receives a request for a license for encrypted content from a user managed by the server 10, and then provides the user with a license which contains information (e.g., a decryption key) for decrypting the encrypted content, obtained from the first decryption information associated with the encrypted content, based on the policy registered in the memory 12 in association with the encrypted content.

Upon receipt of the license from the providing unit 14, the requester or the user device 100 thereof releases the content from protection, using the protection release information contained in the license, to thereby restore the original content. For example, the requester or the user device thereof 100 decrypts the encrypted content, using the decryption information contained in the license, to thereby restore the original content.

Meanwhile, when a request for a license for the content having been protected using the first and second protection information is received from a user managed by the server 20, the providing unit 24 provides the user with a license which contains information for releasing the content from protection, obtained from the second protection release information associated with the content, based on the policy registered in the memory 22 in association with the content. For example, the providing unit 24 receives a request for a license for the encrypted content from a user managed by the server 20, and then provides the user with a license which contains information (e.g., a decryption key) for decrypting the encrypted content, obtained from the second decryption information associated with the encrypted content, based on the policy registered in the memory 22 in association with the encrypted content.

Upon receipt of the license from the providing unit 24, the requester or the user device 200 thereof releases the protected content from protection, using the protection release information contained in the license, to thereby restore the original content. For example, the requester or the user device 200 thereof decrypts the encrypted content, using the decryption information contained in the license, to thereby restore the original content.

Notably, there may be set the kind of function of the server 10, permitted to be provided to each user managed by the server 10, that is, usage permission concerning the server 10. Likewise, there may be set the kind of function of the server 20, permitted to be provided to each user managed by the server 20, that is, usage permission concerning the server 20.

In the following, an operation of the information usage control system 1 according to this exemplary embodiment will be specifically described, while individually explaining protected content production, license issuance by the server 10, license issuance by the server 20, and policy revocation.

(Protected Content Production)

Figure 8:
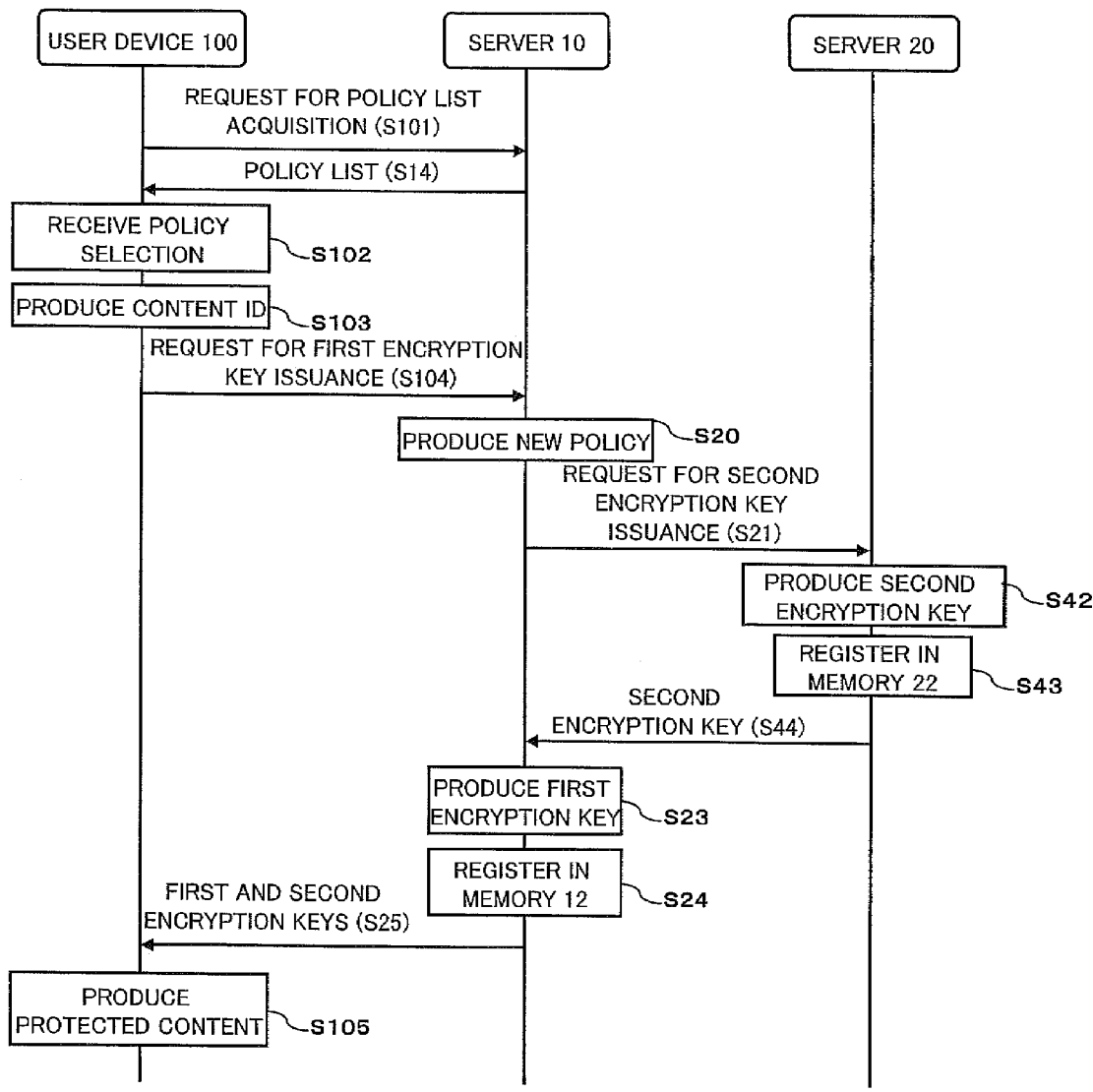
FIG. 8 is a sequence diagram showing one example of a protected content production process.
Figure 9:
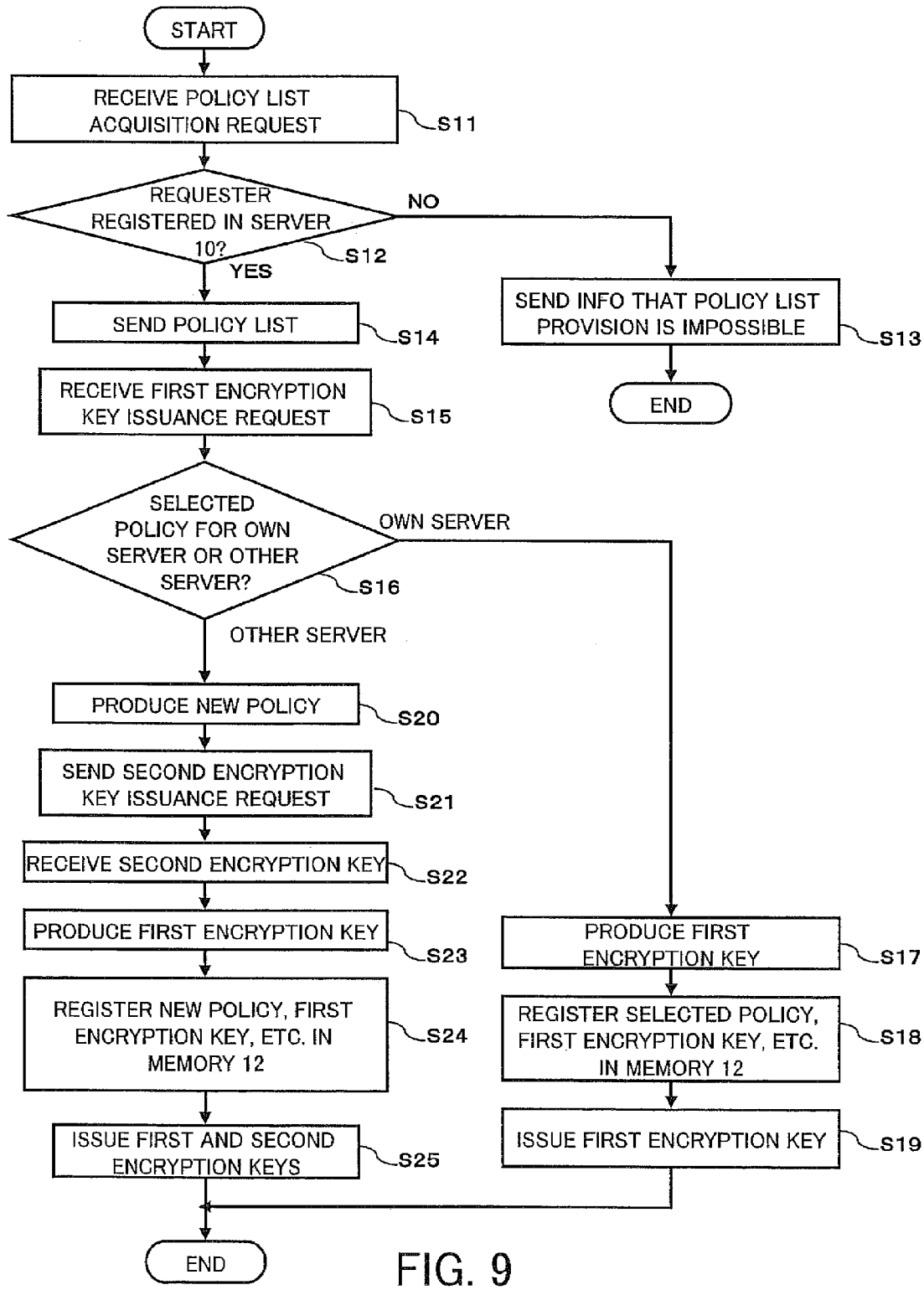
FIG. 9 is a flowchart of one example of an operation of the server 10 in protected content production.
Figure 10:
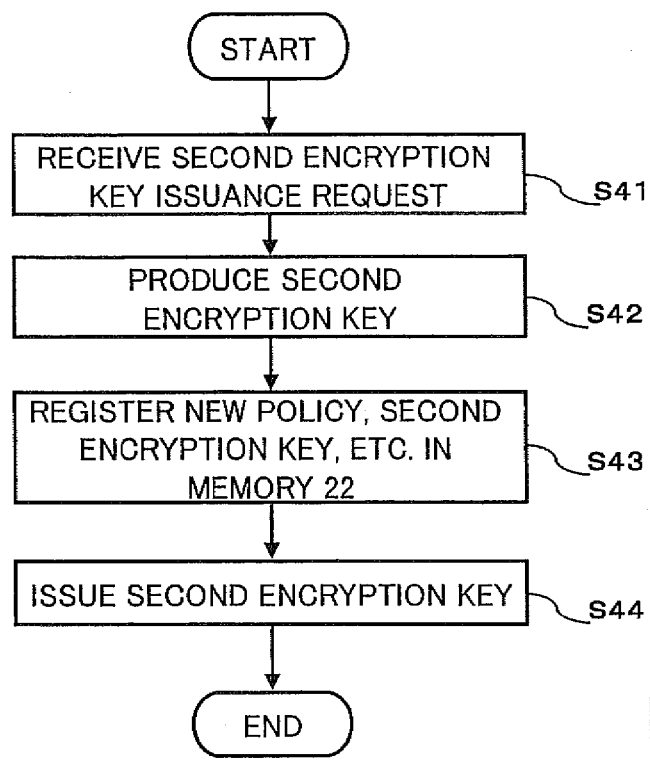
FIG. 10 is a flowchart of one example of an operation of the server 20 in protected content production.

FIG. 8 is a sequential diagram showing one example of a protected content production process; FIG. 9 is a flowchart of one example of an operation of the server 10 in protected content production; and FIG. 10 is a flowchart of one example of an operation of the server 20 in protected content production. In the following, with reference to FIGS. 8 to 10, one example of a protected content production process will be described.

Initially, with trust relation established between the server 10 and the servers 20, 20-1, 20-2, and so forth, the server 10 receives other-server policies from the servers 20 and so forth.

The user device 100 sends a policy list acquisition request containing the user ID to the server 10 (S101), in which the user ID may be input by the user or read from, as stored beforehand in, the user device 100.

Upon receipt of the policy list acquisition request from the user device 100 (S11), the server 10 determines whether or not the user ID contained in the policy list acquisition request is registered in the user memory 11 (S12).

When it is determined that the user ID is not registered (S12: NO), the server 10 sends the user device 100 information stating that provision of a policy list is impossible (S13).

On the other hand, when it is determined that the user ID is registered (S12: YES); e.g., when the user ID is "user 11," the server 10 sends the user device 100 a list of policies for use in its own server, registered in the policy table of the memory 12, and a list of other-server policies, registered in the other-server policy memory 16 (S14).

The user device 100 displays the received policy lists on the screen and receives policy selection made on the monitor by the user (S102). In the above, e.g., the policy ID and content of each policy are shown in association with each other on the monitor.

The user device 100 then produces the content ID of the content to be protected (protection target content), and embeds the content ID in the protection target content (S103).

Thereafter, the user device 100 sends to the server 10 a first encryption key issuance request which contains the policy ID of the selected policy and the produced content ID (S104).

Upon receipt of the first encryption key issuance request from the user device 100 (S15), the server 10 determines, by reference to the policy ID contained in the first encryption key issuance request, whether the selected policy is managed by its own server 10 or by another server (S16).

When it is determined that the selected policy is managed by its own server 10, the server 10 produces a first encryption key (e.g., a public key) for encrypting the protection target content (S17), then registers the content ID and the policy ID, both contained in the first encryption key issuance request, and a first decryption key corresponding to the produced first encryption key in the memory 12 so as to be associated with one another (S18), and issues the produced first encryption key to the user device 100 (S19).

Upon receipt of the first encryption key from the server 10, the user device 100 encrypts the protection target content, using the first encryption key, to thereby produce protected content.

On the other hand, when it is determined in S16 that the selected policy is managed by another server, the server 10 produces a new policy which contains the selected other-server policy or the policy ID thereof and a predetermined policy for use in the server 10 or the policy ID thereof (S20). In the above, the server 10 produces a new policy which contains the policy ID of the selected other-server policy and permits the requester (the producer) to use the content. Notably, it is assumed here that a policy having the policy ID "policy 2A" (hereinafter denoted as a "policy 2A") for use in the server 20 is selected.

Thereafter, the server 10 sends to the server (here, the server 20) having provided the selected policy a second encryption key issuance request which contains the policy ID and content of the produced new policy and the content ID contained in the first encryption key issuance request (S21).

Upon receipt the second encryption key issuance request from the server 10 (S41), the server 20 produces a second encryption key (e.g., a public key) for encrypting the protection target content (S42). The server 20 then registers the content ID and the policy ID and content of the policy, all contained in the second encryption key issuance request, and a second decryption key corresponding to the second encryption key in the memory 22 so as to be associated with one another (S43). For example, as shown in FIG. 11, the policy ID "policy 13" and content of the new policy and the second decryption key (not shown) are registered in the policy table of the memory 22 so as to be associated with one another, while, as shown in FIG. 12, the content ID "content 13" of the protection target content and the policy ID "policy 13" of the new policy are registered in the association table of the memory 22 so as to be associated with each other. Notably, as shown in FIG. 11, it may be the case that a part of the new policy, which is used in the server 10, is not registered in the memory 22 or sent from the server 10 to the server 20.

The server 20 then issues the produced second encryption key to the server 10 (S44).

Upon receipt of the second encryption key from the server 20 (S22), the server 10 produces a first encryption key (e.g., a public key) for encrypting the protection target content (S23), and registers the content ID of the protection target content, the policy ID and content of the new policy, and a first decryption key corresponding to the first encryption key in the memory 12 so as to be associated with one another (S24). For example, as shown in FIG. 13, the policy ID, or here, "policy 13," and content of the new policy and a first decryption key (not shown) are registered in the policy table of the memory 12 so as to be associated with one another, while, as shown in FIG. 14, the content ID "content 13" of the protection target content and the policy ID "policy 13" of the new policy are registered in the association table of the memory 12 so as to be associated with each other.

The server 10 then issues, to the user device 100, the first encryption key produced by the server 10 and the second encryption key produced by the server 20 (S25).

The user device 100 encrypts the protection target content, using the different keys; that is, the first encryption key issued by the server 10 and the second encryption key issued by the server 10, to thereby produce protected content which can be decrypted using the first or second decryption key (S105).

(License Issuance by Server 10)

Figure 15:
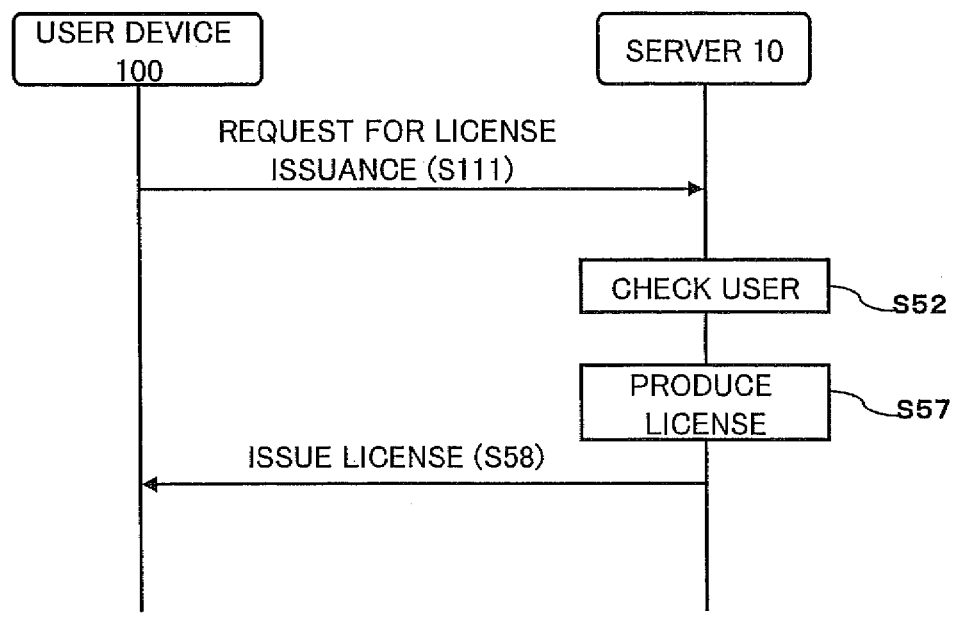
FIG. 15 is a sequence diagram of one example of a license issuance process executed by the server 10.
Figure 16:
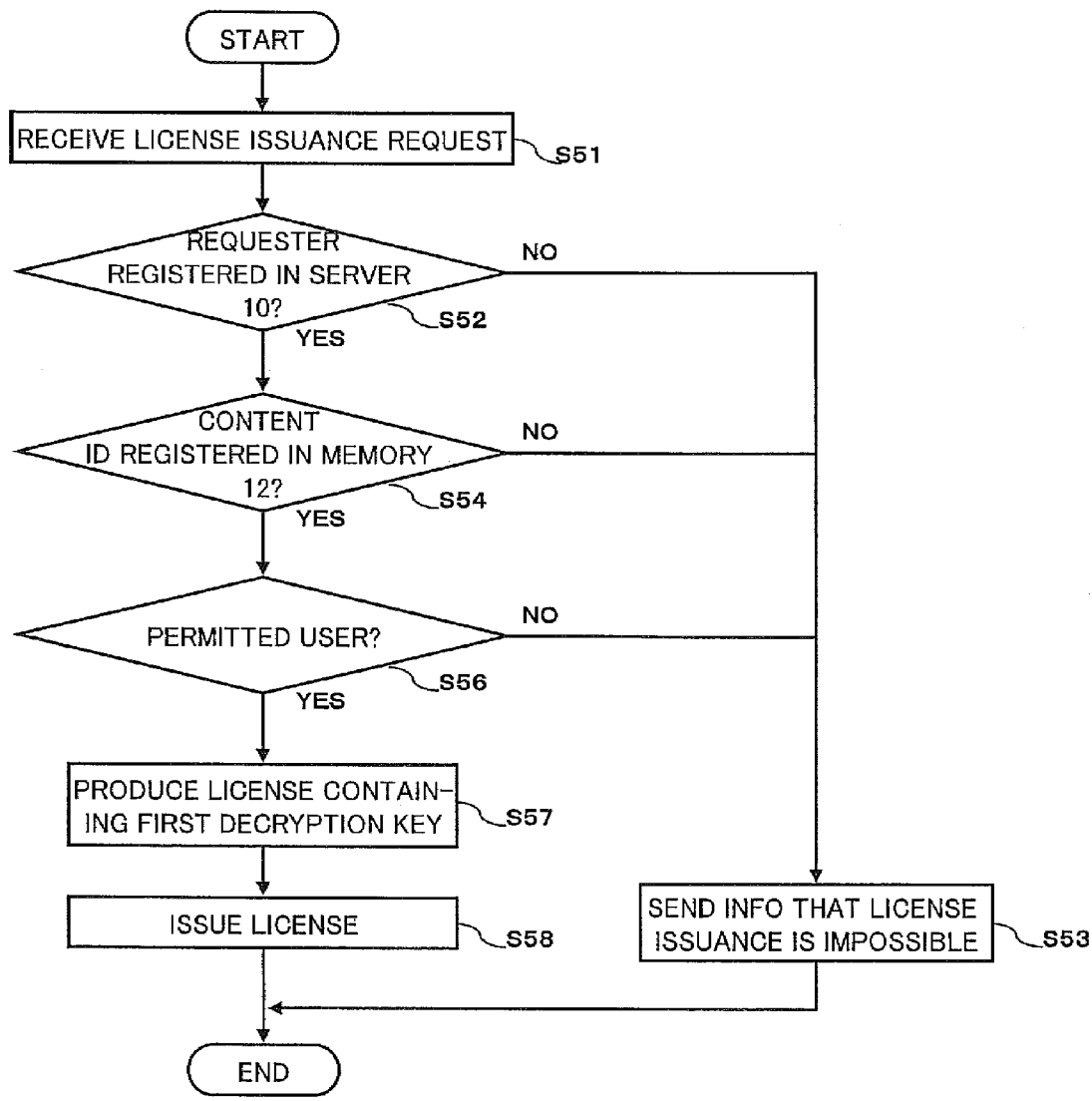
FIG. 16 is a flowchart of one example of an operation of the server 10 in license issuance.

FIG. 15 is a sequential diagram showing one example of a license issuance process by the server 10; and FIG. 16 is a flowchart of one example of an operation of the server 10 in license issuance. In the following, one example of a license issuance process by the server 10 will be described with reference to FIGS. 15 and 16.

A user wishing to use protected content operates the user device 100 (specifically, application software for using protected content) to activate the protected content.

Upon receipt from the user of an instruction to activate the protected content, the user device 100 extracts the content ID from the protected content, and sends the server 10 a license issuance request which contains the content ID and the user ID (S111), in which the user ID may be input by the user or read from, as stored beforehand in, the user device 100.

Upon receipt of the license issuance request from the user device 100 (S51), the server 10 determines whether or not the user ID contained in the license issuance request is registered in the user memory 11 (S52).

When it is determined that the user ID is not registered (S52: NO), the server 10 sends the user device 100 information stating that license issuance is impossible (S53).

On the other hand, when it is determined that the user ID is registered (S52: YES), the server 10 determines whether or not the content ID contained in the issuance request is registered in the memory 12 (S54).

When it is determined that the content ID is not registered (S54: NO), the server 10 sends the user device 100 information stating that license issuance is impossible (S53).

On the other hand, when it is determined that the content ID is registered (S54: YES), the server 10 performs a license issuance process to the requester, based on the policy stored in the memory 12 in association with the content ID. Specifically, the server 10 determines, based on the policy associated with the content ID, whether or not the user identified by the user ID contained in the license issuance request is a user permitted to use the content (S56).

When it is determined that the user is not permitted to use the content (S56: NO), the server 10 sends the user device 100 information stating that license issuance is impossible (S53).

On the other hand, when it is determined that the user is permitted to use the content (S56: YES), the server 10 produces a license which contains usage condition information set for the user in the policy and a first decryption key associated with the content ID contained in the license issuance request (S57), and issues the produced license to the user device 100 (S58).

(License Issuance by Server 20)

Figure 17:
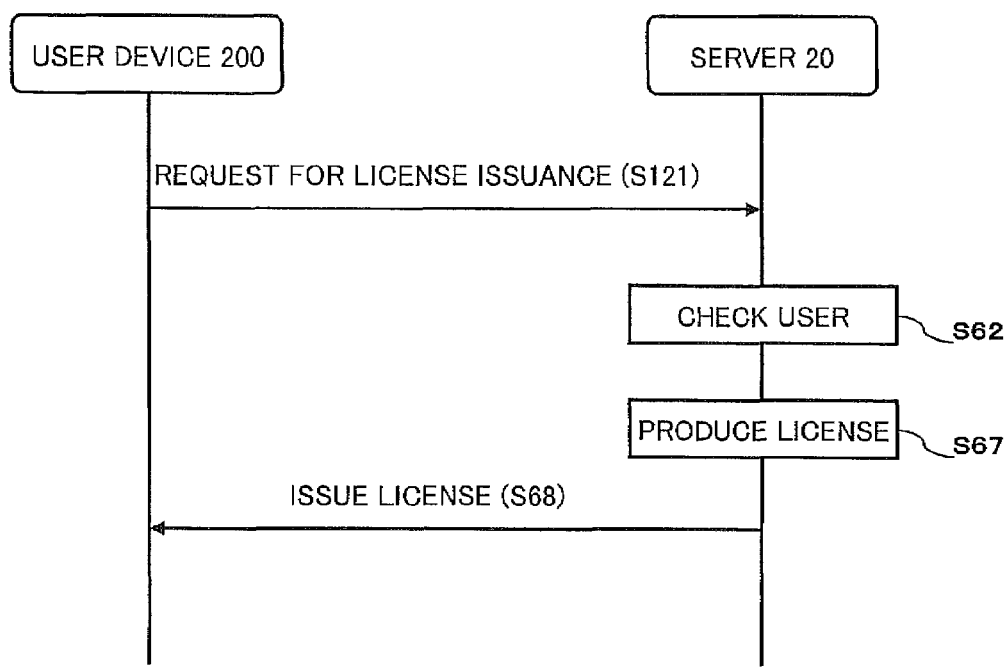
FIG. 17 is a sequence diagram showing one example of a license issuance process executed by the server 20.
Figure 18:
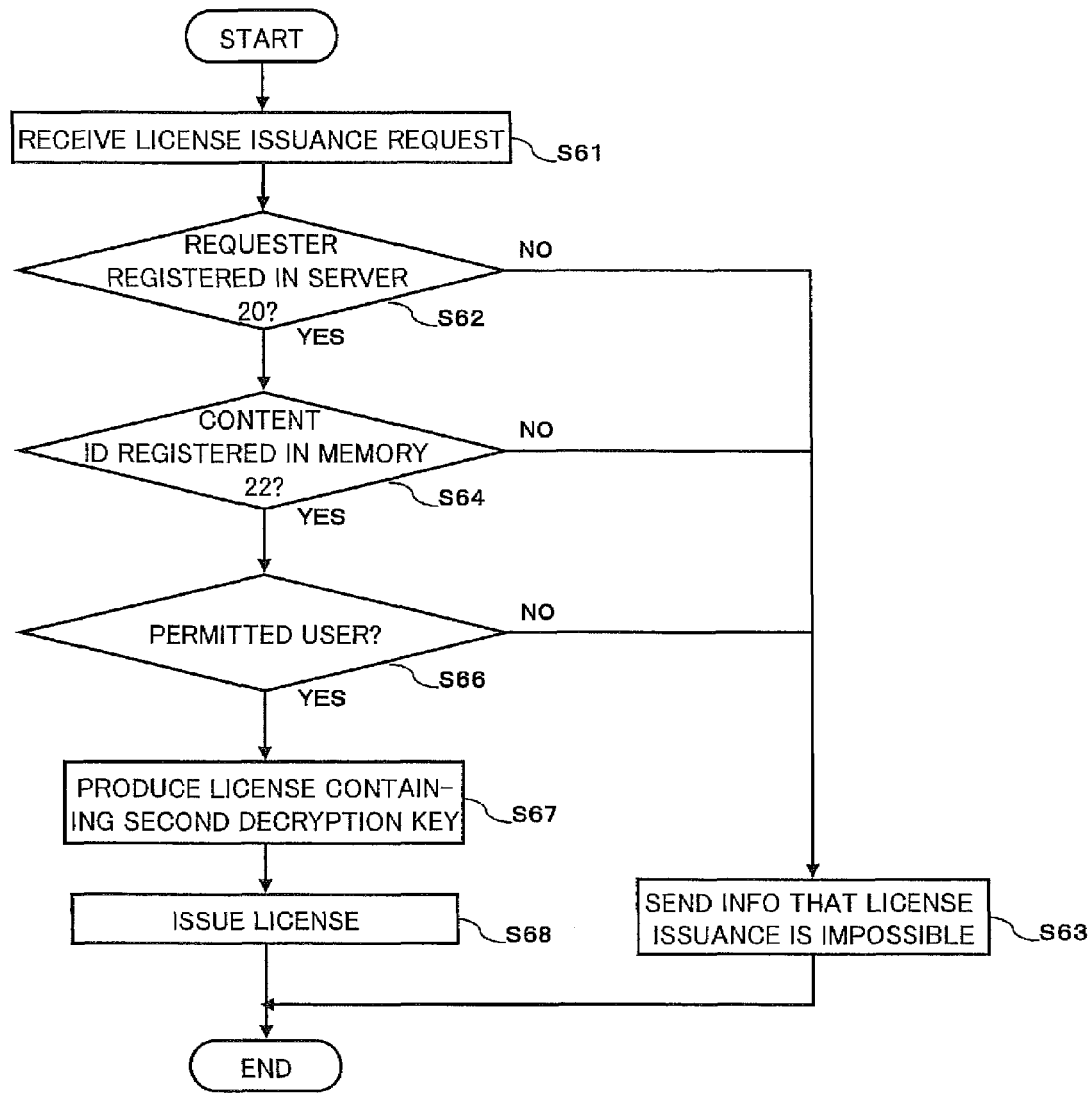
FIG. 18 is a flowchart of one example of an operation of the server 20 in license issuance.

FIG. 17 is a sequential diagram showing one example of a license issuance process performed by the server 20; and FIG. 18 is a flowchart of one example of an operation of the server 20 in license issuance. In the following, with reference to FIGS. 17 and 18, one example of a license issuance process performed by the server 20 will be described.

The user wishing to use protected content operates the user device 200 (specifically, application software for using protected content) to activate the protected content.

Upon receipt from the user of an instruction to activate the protected content, the user device 200 extracts the content ID from the protected content, and sends to the server 20 a license issuance request which contains the content ID and the user ID (S121), in which the user ID may be input by the user or read from, as stored beforehand in, the user device 200.

Upon receipt of the license issuance request from the user device 200 (S61), the server 20 determines whether or not the user ID contained in the license issuance request is registered in the user memory 21 (S62).

When it is determined that the user ID is not registered (S62: NO), the server 20 sends the user device 200 information stating that license issuance is impossible (S63).

On the other hand, when it is determined that the user ID is registered (S62: YES), the server 20 determines whether or not the content ID contained in the license issuance request is registered in the memory 22 (S64).

When it is determined that the content ID is not registered (S64: NO), the server 20 sends the user device 200 information stating that license issuance is impossible (S63).

On the other hand, when it is determined that the content ID is registered (S64: YES), the server 20 performs a license issuance process to the requester, based on the policy stored in the memory 22 in association with the content ID.

Specifically, the server 20 determines, based on the policy associated with the content ID, whether or not the user identified by the user ID contained in the license issuance request is a user permitted to use the content (S66).

When it is determined that the user is not permitted to use the content (S66: NO), the server 20 sends the user device 200 information stating that license issuance is impossible (S63).

On the other hand, when it is determined that the user is permitted to use (S66: YES), the server 20 produces a license which contains usage condition information set for the user in the policy and a second decryption key associated with the content ID contained in the license issuance request (S67), and issues the produced license to the user device 200 (S68).

For example, with the policy table of the memory 22 such as that shown in FIG. 11, the association table of the memory 22 such as that shown in FIG. 12, and the content ID "content 13" contained in the license issuance request, the server 20 operates as follows.

That is, with reference to the association table shown in FIG. 12, the server 20 specifies the policy ID; namely, here "policy 13", which is associated with the content ID "content 13," and with reference to the policy table shown in FIG. 11, obtains the policy "policy 13" from the policy table shown in FIG. 11. As the policy makes reference to the policy "policy 2A", the server 20 obtains the policy "policy 2A" from the other-server providing policy memory 26, and carries out a license issuance process, based on the policy "policy 2A." For example, in the case where the user ID contained in the license issuance request is "user 25," as this user ID is not mentioned in the policy 2A, according to FIG. 7, the server 20 sends the user device 200 information stating that license issuance is impossible. Meanwhile, in the case where the user ID contained in the license issuance request is "user 21," as this user ID is mentioned in the policy 2A, the server 20 sends the user device 200 a license which contains usage condition information "a valid period: unlimited, permitted operation: review" corresponding to that user ID.

(Policy Revocation)

Figure 19:
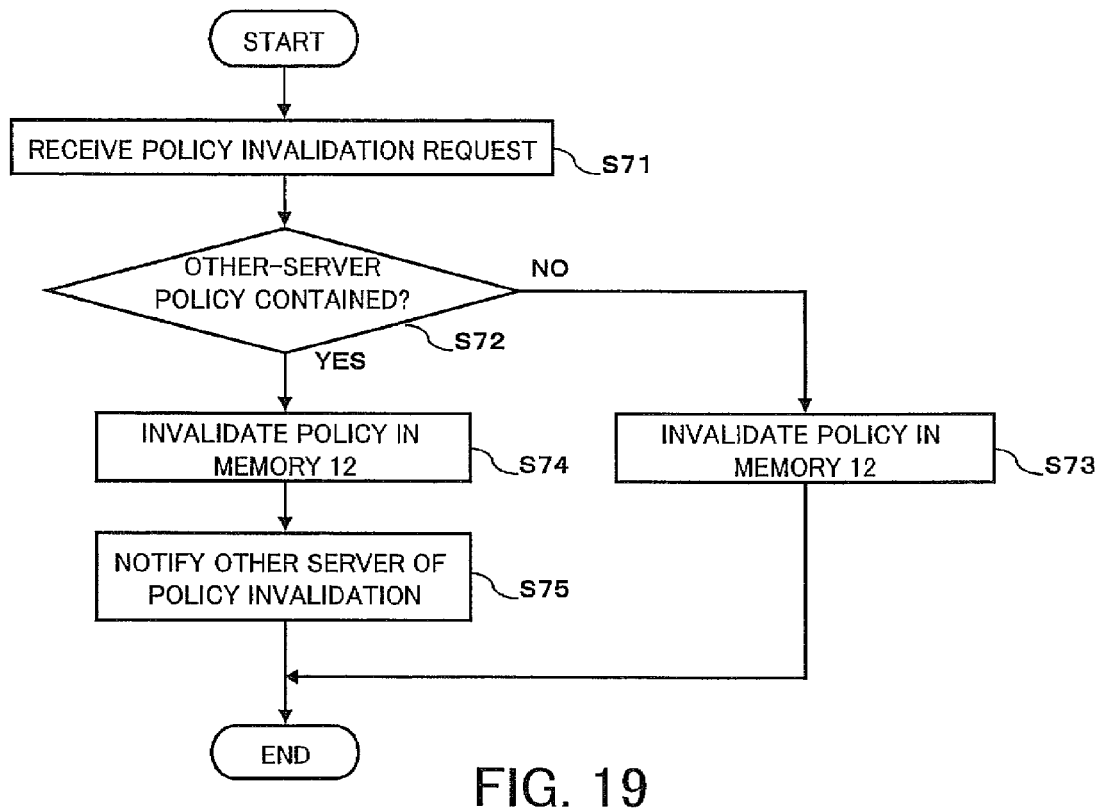
FIG. 19 is a flowchart of one example of an operation of the server 10 in a policy revocation process.
Figure 20:
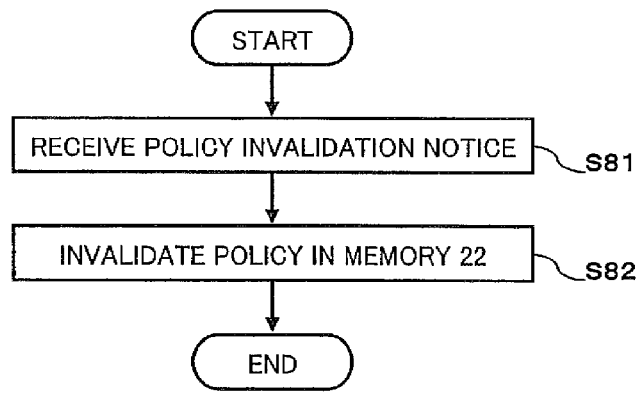
FIG. 20 is a flowchart of one example of an operation of the server 20 in a policy revocation process.

FIG. 19 is a flowchart of one example of an operation of the server 10 in a policy revocation process; and FIG. 20 is a flowchart of one example of an operation of the server 20 in the policy revocation process. In the following, while referring to FIGS. 19 and 20, one example of a policy revocation process will be described.

The server 10 receives from the administrator or the like of the server 10 an revocation request which contains the policy ID of a policy to be revoked (S71).

Then, with reference to the memory 12, the server 10 determines whether or not the policy identified by the policy ID contained in the revocation request includes an other-server policy (S72).

When it is determined that no other-server policy is included (S72: NO), the server 10 revokes the policy having that policy ID, registered in the policy table of the memory 12 (S73), as a result of which the content stored in the memory 12 in association with that policy ID is revoked. For example, with reference to FIG. 14, in the case where the policy ID contained in the revocation request is, e.g., "policy 11," the policy "policy 11" stored in the memory 12 is revoked, and the content having the content ID, or here "content 11," which is associated with that policy in the memory 12, is revoked. As a result, no license will thereafter be issued for the content.

On the other hand, when it is determined that an other-server policy is included (S72: YES), the server 10 revokes the policy having that policy ID, registered in the policy table of the memory 12 (S74), and notifies the server having provided the policy of the revocation of the policy having that policy ID (S75). In the above, it is assumed that the server 10 receives an revocation request which contains the policy ID "policy 13," and with reference to the policy table shown in FIG. 13 and the table shown in FIG. 6, notifies the server 20 having provided the policy "policy 2A," contained in the policy "policy 13," of the revocation of the policy "policy 13."

Upon receipt of the notice about revocation of the policy "policy 13" (S1), the server 20 revokes the policy "policy 13," registered in the policy table of the memory 22 (S82). Consequently, the content having the content ID, or here, "content 13," which is associated with the policy ID "policy 13" in the memory 22, is revoked. As a result, no license will thereafter be issued for the content with respect to either a user managed by the server 10 or a user managed by the server 20. In the above, neither the policy "policy 2A" contained in the revoked policy "policy 13" nor the content associated with the policy "policy 2A" is affected.

Second Exemplary Embodiment

In the following, an information usage control system according to a second exemplary embodiment will be described. Notably, elements common to those of the information usage control system according to the first exemplary embodiment are assigned identical reference numerals, and description thereof is not repeated.

In this embodiment, a policy which contains an other-server policy is produced beforehand by the server 10 or the user thereof, or the like, based on the other-server policy provided by another server, and the produced policy is registered in the memory 12. For example, a policy which contains an other-server policy and a server 10 policy is produced beforehand, and registered in the memory 12. This policy production may be carried out at any time.

FIG. 21 is a diagram showing one example of a policy table of the memory 12 according to this exemplary embodiment. In the example shown in FIG. 21, a policy which contains a server 20 policy and a server 10 policy (a policy "policy 14" or "policy 15"), in addition to a policy which contains a server 10 policy alone (a policy "policy 11" or "policy 12"), is registered in the policy table. The policy "policy 14" contains a server 20 policy "policy 2A," while a policy "policy 15" contains a server 20 policy "policy 2B."

In the following, an operation of the information usage control system according to this exemplary embodiment will be described, while individually explaining protected content production and policy revocation. Note that license issuance is identical with that of the first exemplary embodiment.

(Protected Content Production)

Figure 22:
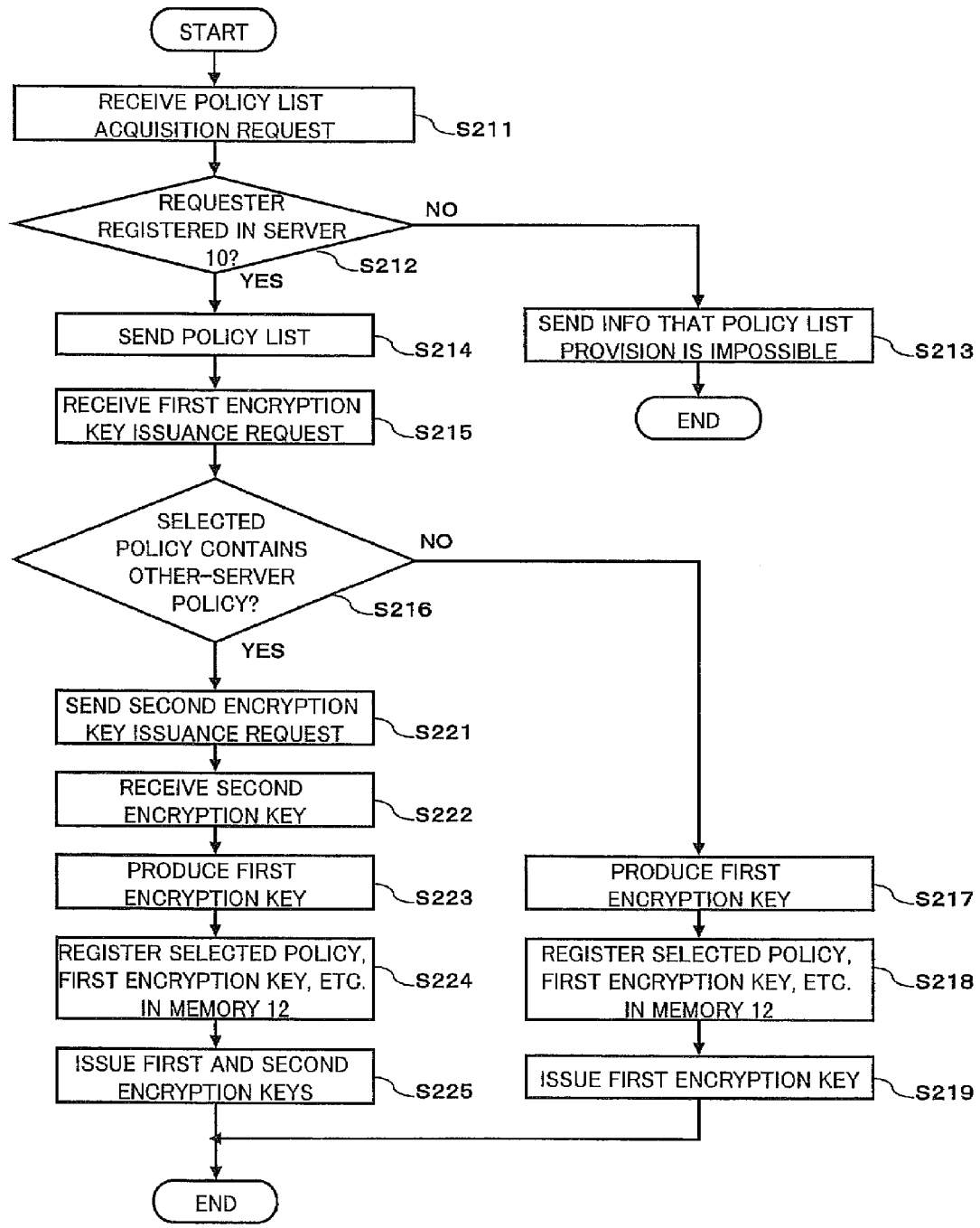
FIG. 22 is a flowchart of one example of an operation of the server 10 in protected content production according to the second exemplary embodiment.
Figure 23:
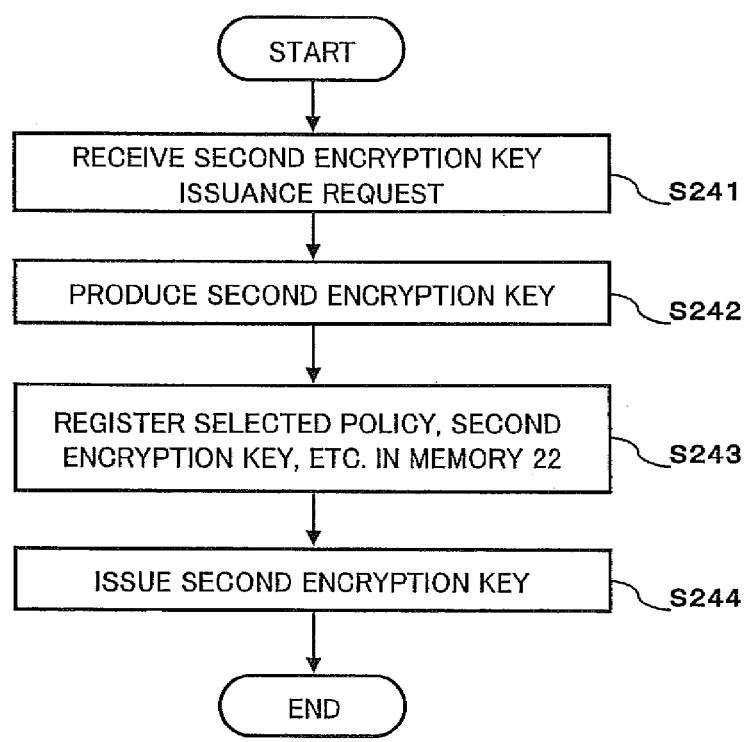
FIG. 23 is a flowchart of one example of an operation of the server 20 in protected content production according to the second exemplary embodiment.

FIG. 22 is a flowchart of one example of an operation of the server 10 in protected content production; and FIG. 23 is a flowchart of one example of an operation of the server 20 in protected content production. In the following, with reference to FIGS. 22 and 23, one example of a protected content production process will be described.

The server 10, upon receipt of a policy list acquisition request containing the user ID from the user device 100 (S211), determines whether or not the user ID contained in the policy list acquisition request is registered in the user memory 11 (S212).

When it is determined that the user ID is not registered (S212: NO), the server 10 sends the user device 100 information stating that policy list provision is impossible (S213).

On the other hand, when it is determined that the user ID is registered (S212: YES), the server 10 sends the user device 100 a list of policies registered in the policy table of the memory 12 (S214).

Thereafter, the server 10 receives from the user device 100 a first encryption key issuance request which contains the policy ID of the policy selected by the user and the content ID of the protection target content (S215), and determines, based on the policy ID contained in the first encryption key issuance request, whether or not the selected policy contains an other-server policy (S216).

When it is determined that the selected policy contains no other-server policy (S216: NO), the server 10 produces a first encryption key (S217); registers the content ID, policy ID, and first decryption key corresponding to the first encryption key in the memory 12 so as to be associated with one another (S218); and issues the first encryption key to the user device 100 (S219).

On the other hand, when it is determined that the selected policy contains an other-server policy (S216: YES), the server 10 sends a second encryption key issuance request which contains the policy ID and content of the selected policy and the content ID contained in the first encryption key issuance request to the server having provided the other-server policy contained in the selected policy (S221). In the above, it is assumed that the policy "policy 14" is selected, and therefore the server 10 sends a second encryption key issuance request to the server 20 having provided the policy "policy 2A," or the policy contained in the selected policy "policy 14."

Upon receipt of the second encryption key issuance request from the server 10 (S241), the server 20 produces a second encryption key (S242); and registers the content ID and the policy ID and content of the policy, all contained in the second encryption key issuance request, and a second decryption key corresponding to the second encryption key in the memory 22 so as to be associated with one another (S243). For example, the policy ID "policy 14" and content of the selected policy and the second decryption key are registered in the policy table of the memory 22 so as to be associated with one another, and the content ID of the protection target content and the policy ID "policy 14" of the selected policy are registered in the association table of the memory 22 so as to be associated with each other. Notably, it may be the case that a part of the selected policy, which is used in the server 10 is not registered in the memory 22 or is not sent from the server 10 to the server 20.

The server 20 then issues the produced second encryption key to the server 10 (S244).

Upon receipt of the second encryption key from the server 20 (S222), the server 10 produces a first encryption key (S223); and registers the content ID of the protection target content, the policy ID and content of the selected policy, and a first decryption key corresponding to the first encryption key, in the memory 12 so as to be associated with one another (S224). For example, the policy ID "policy 14" and content of the selected policy and the first decryption key are registered in the policy table of the memory 12 so as to be associated with one another. The content ID of the protection target content and the policy ID "policy 14" of the selected policy are registered in the association table of the memory 12 so as to be associated with each other.

Thereafter, the server 10 issues the first encryption key produced by the server 10 and the second encryption key produced by the server 20 to the user device 100 (S225).

As described above, in this exemplary embodiment, a list of other-server policies is provided in the form of a policy list which contains other-server policies and server 10 policies. That is, it is unnecessary for an other-server policy list to be provided in its original form, but the other-server policy list may be provided in various forms.

(Policy Revocation)

In the first exemplary embodiment, a policy containing an other-server policy is newly produced with respect to specific content. That is, the produced policy corresponds to that one piece of content. Therefore, revocation of the policy containing an other-server policy results in revocation of one corresponding piece of content.

Meanwhile, in the second exemplary embodiment, a policy containing an other-server policy is applicable to multiple pieces of content. That is, the policy corresponds to one or more pieces of contents. Therefore, revocation of the policy containing an other-server policy results in revocation of one or more corresponding pieces of contents.

It should be noted that operations of the servers 10 and 20 in a policy revocation process are identical to that described in the first exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An information usage control system, comprising:
   first and second information usage control devices that each register, in response to a registration request from a user managed by its own information usage control device, usage control information for controlling use of control target information in a memory of its own information usage control device, so as to be associated with the control target information, and provide, upon receipt of an issuance request for usage information concerning the control target information from the user managed by its own information usage control device, the user with the usage information for using the control target information, based on the usage control information registered in the memory of its own information usage control device so as to be associated with the control target information, wherein
   the first information usage control device and the second information usage control device manage different set of users,
   the first information usage control device includes a first information processing unit that provides, in response to the registration request from the user managed by its own information usage control device, the user with a list of the usage control information for users managed by the second information usage control device, and upon receipt of selection of the usage control information out of the list, sends the selected usage control information to the second information usage control device so as to be associated with control target information to which the usage control information is applied, and
   the second information usage control device includes a second information processing unit that receives the usage control information associated with the control target information, sent from the first information processing unit, and registers the usage control information in the memory of its own information usage control device so as to be associated with the control target information.

2. The information usage control system according to claim 1, wherein the second information processing unit sends, upon receipt of the usage control information associated with the control target information, second protection information for protecting the control target information to the first information processing unit, and registers second protection release information corresponding to the second protection information in the memory of the second information usage control device so as to be associated with the control target information, the first information processing unit provides the user having sent the request with the second protection information from the second information processing unit and first protection information for protecting the control target information, and registers the usage control information concerning the control target information for use in the first information usage control device and first protection release information corresponding to the first protection information in the memory of the first information usage control device so as to be associated with the control target information, the first information usage control device includes a first providing unit that provides, upon receipt of a request for usage information concerning the control target information having been protected using the first and second protection information from the user managed by its own information usage control device, the user with usage information which contains information for releasing the control target information from protection, obtained from the first protection release information associated with the control target information, based on the usage control information registered in the memory of its own information usage control device so as to be associated with the control target information, and the second information usage control device includes a second providing unit that provides, upon receipt of a request for usage information concerning the control target information having been protected using the first and second protection information from the user managed by its own information usage control device, the user with usage information which contains information for releasing the control target information from protection, obtained from the second protection release information associated with the control target information, based on the usage control information registered in the memory of its own information usage control device so as to be associated with the control target information.

3. An information usage control device, comprising:
  a registration unit that registers, in response to a registration request from a user managed by its own information usage control device, usage control information for controlling use of control target information in a memory so as to be associated with the control target information;
  a providing unit that provides, upon receipt of an issuance request for usage information concerning the control target information from the user managed by its own information usage control device, the user with the usage information for using the control target information, based on the usage control information registered in the memory so as to be associated with the control target information; and
  an information processing unit that provides, in response to the request from the user managed by its own information usage control device, the user with a list of the usage control information for users managed by another information usage control device, then receives selection of the usage control information from the list, and sends the selected usage control information to the other information usage control device so as to be associated with the control target information to which the usage control information is applied, wherein the information usage control device and the other information usage control device manage different set of users, and wherein the other information usage control device, in response to a registration request from a user managed by its own information usage control device, registers the usage control information for controlling use of the control target information in a memory of its own information usage control device so as to be associated with the control target information, and upon receipt of an issuance request for usage information concerning the control target information from the user managed by its own information usage control device, provides the user with the usage information for using the control target information, based on the usage control information registered in the memory of its own information usage control device so as to be associated with the control target information.

4. An information usage control device, comprising:
  a registration unit that registers, in response to a registration request from a user managed by its own information usage control device, usage control information for controlling use of control target information in a memory so as to be associated with the control target information;
  a providing unit that provides, upon receipt of an issuance request for usage information concerning the control target information from the user managed by its own information usage control device, the user with the usage information for using the control target information, based on the usage control information registered in the memory so as to be associated with the control target information; and
  an information processing unit that receives, from another information usage control device that registers, in response to a registration request from a user managed by its own information usage control device, usage control information for controlling use of control target information in a memory of its own information usage control device so as to be associated with the control target information, and upon receipt of an issuance request for usage information concerning the control target information from the user managed by its own information usage control device, provides the user with the usage information for using the control target information, based on the usage control information registered in the memory of its own information usage control device so as to be associated with the control target information, the usage control information associated with the control target information and selected by the user managed by the other information usage control device, and registers the usage control information in the memory of its own information usage control device so as to be associated with the control target information, wherein the information usage control device and the other information usage control device manage different set of users.

5. An information usage control system, comprising:
a first license issuance server; and
a second license issuance server that communicates with the first license issuance server via a network;
said first license issuance server including,
  a first user management unit that manages a first user,
  a first policy management unit that manages a first policy information defining a range for permitting use of a first content by the first user,
  a first policy memory unit that stores information related to the first content and the first policy in correlation with each other, and
  a first license providing unit that provides a first license information related to use of the first content by the first user based on the first policy information set with respect to the first content by a policy setting unit;
said second license issuance server including,
  a second user management unit that manages a second user,
  a second policy management unit that manages a second policy information defining a range for permitting use of a second content by the second user,
  a second policy memory unit that stores information related to the second content and the second policy in correlation with each other, and
  a second license providing unit that provides a second license information related to use of the second content by the second user based on the second policy information set with respect to the second content by a second policy setting unit;
said second user being not registered in the first user management unit;

said second license issuance server providing the second policy information to the first license issuance server;

said first license issuance server storing the second policy information provided from said second license issuance server into a first trust relationship management unit;

said first license issuance server providing the second policy information stored in the first trust relationship management unit to the first user;

said first license issuance server receiving selection of the second policy information by the first user;

said first license issuance server generating a first public key and a first decryption key for encrypting and decrypting the first content;

said first license issuance server additionally storing, into the first policy memory unit, a third policy information defining a range for permitting use of the first content based on the selected second policy information, in correlation with the information related to the first content and the first decryption key;

said first license issuance server transmitting, to the second license issuance server, the information related to the first content and the third policy information; and said first license issuance server requesting the second license issuance server to issue a second public key;

said second license issuance server generating a second public key and a second decryption key for encrypting and decrypting the first content received from the first license issuance server;

said second license issuance server additionally storing, into the second policy memory unit, the information related to the first content, the third policy information, and the second decryption key in correlation with each other; and said second license issuance server transmitting the second public key to the first license issuance server;

said first license issuance server transmitting the first public key and the second public key to the first user;

said first license providing unit issuing a license to the first user based on the third policy information and the first decryption key stored within the first policy memory unit when said first license providing unit receives, from the first user, a license issuance request for the first content encrypted by the first public key;

said second license providing unit issuing a license to the second user based on the third policy information and the second decryption key stored within the second policy memory unit when said second license providing unit receives, from the second user, a license issuance request for the first content encrypted by the second public key.

* * * * *